Aug. 13, 1957  T. R. MASSEY  2,802,569

PACKAGE

Filed June 9, 1955

INVENTOR.
THEODORE R. MASSEY

BY Joseph Rossman

ATTORNEY

United States Patent Office 2,802,569
Patented Aug. 13, 1957

2,802,569

PACKAGE

Theodore R. Massey, Milwaukee, Wis., assignor to Marathon Corporation, Rothschild, Wis., a corporation of Wisconsin Application June 9, 1955, Serial No. 514,158

1 Claim. (Cl. 206—78)

This invention relates to a package having the contents enclosed in a transparent container which is reinforced and supported by a suitably cut and folded sheet material. Such package is especially adapted for packaging sliced cheese, meats and the like for display in food stores.

Figure 1:
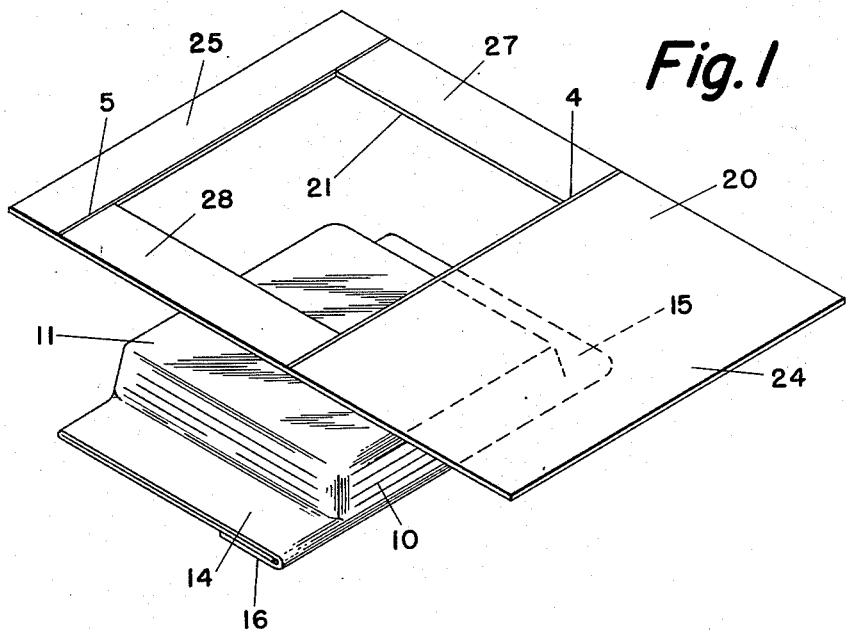
Figure 2:
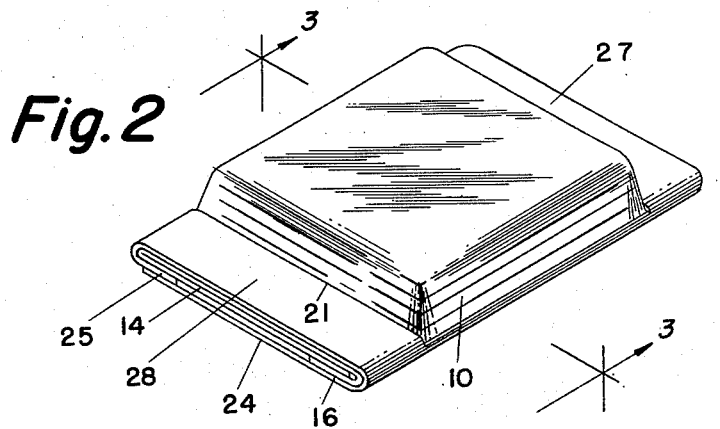
Figure 3:
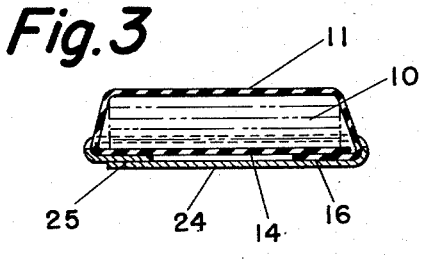

Further advantages and details of the invention will be apparent from the following specification and accompanying drawings, wherein Figure 1 is a perspective disassembled view of the transparent container and the reinforcing blank, Figure 2 is a perspective view of the completed package, and Figure 3 is a sectional view taken on lines 3—3 of Figure 2.

Referring to the drawings, a stack 10 of sliced meat, cheese, and the like, is enclosed in a transparent container 11. The container may be made of suitable flexible transparent heat-sealable material, such as cellophane having a heat-sealable coating, polyethylene film, rubber hydrochloride film and the like. The container 11 may be made for example of a sheet of transparent material of suitable dimensions which is enfolded or wrapped about the stack 10 and the extending marginal portions 14 and 15 as well as the longitudinal margin 16 are then heat sealed by application of suitable heat and pressure to provide a hermetically sealed transparent container, as shown in Figure 1. The container may be suitably evacuated before being hermetically sealed or the air in the container may be displaced by an inert gas, such as nitrogen or carbon dioxide before being sealed.

A cardboard blank 20 is provided which is suitably cut out to provide a rectangular window 21 and panels 24 and 25 formed by score lines 4 and 5, respectively, as shown in Figure 1. Marginal panels 27 and 28 are formed by the score lines 4 and 5 and the cut edges of the window 21. The blank is superposed over the stack portion of the container 11 so as to permit the stack portion to pass through the window opening and extend therethrough, as shown in Figure 2. The contour and dimensions of the window are such as to snugly receive and fit the base of the stack portion. The panels 24 and 25 are then folded over the bottom of the stack 10 in overlapping relation, as shown in Figures 2 and 3.

The blank 20 is preferably provided with a suitable heat-sealable adhesive film on its surface or adhesive may be suitably applied to the overlapping portions of panels 24 and 25. Upon application of heat and pressure the superposed panel portions 24 and 25 will be adhered. The extending marginal portions 14 and 15 of the transparent container 11 will be retained between the superposed adhered panel portions 24 and 25 and the marginal panels 27 and 28, as shown in Figures 2 and 3. The adhesive film on the blank 20 may thus serve to bond the entire extending marginal portions 14 and 15 of the transparent container to the areas of the panels 24, 25, 27 and 28.

A rigid multi-ply reinforcement is thus provided for the extending marginal portions 14 and 15 of the transparent receptacle. At the same time the bottom of the stack of sliced comestible 10 is supported on panel 24. If desired, panel 25 may be made of the same dimensions as panel 24 so that the panels 24 and 25 will overlap throughout their entire contacting area to provide a more rigid support.

The panels 27 and 28, as well as the exposed face of panel 24, may be printed with suitable identifying indicia and brand names if desired.

The package made according to the present invention can be made of a minimum amount of materials for effectively and economically packaging many commodities, such as comestibles as well as non-edible articles which it may be desired to display in package form.

It is to be understood that the details of the invention as described are merely illustrative and not necessarily restrictive. The contour and dimensions of the components may be greatly varied. Windows of various shapes and sizes may be provided of various polygonal or circular design. Such modifications and changes are intended to be included within the scope of the appended claim.

I claim:

A reinforced display package comprising a transparent container having a container portion and an opposed pair of extended marginal portions and a reinforcing paperboard blank cut and scored to provide a window opening, a first pair of opposed panels situate on opposite sides of said opening, of width approximately equal to the extension of said marginal portions and of length substantially equal to the dimension of said container portion along the marginal portions, and a second opposed pair of panels situate along the other opposite sides of said window opening and hinged to the ends of the first opposed panels, said second pair of panels each being of width equal to the sum of the adjacent window opening dimension and the combined widths of the first pair of panels adjacent thereto, said second pair of panels having a combined length substantially greater than the dimension of said window opening along said first pair of panels, said container portion being presented through said window opening with the marginal portions in underlying contact with said first panels, and the second pair of panels being folded in overlapping and adhering relation to each other and to underline said marginal portions.

References Cited in the file of this patent

UNITED STATES PATENTS

| | | |
|---|---|---|
| 2,568,625 | Harvey | Sept. 18, 1951 |
| 2,621,129 | Ramsbottom et al. | Dec. 9, 1952 |

FOREIGN PATENTS

| | | |
|---|---|---|
| 958,491 | France | Sept. 12, 1949 |